United States Patent [19]
Fujii et al.

[11] Patent Number: 5,544,060
[45] Date of Patent: Aug. 6, 1996

[54] VEHICLE MOUNTED NAVIGATION SYSTEM WITH PREVIEW FUNCTION

[75] Inventors: Takao Fujii, Cupertino; Toshihiro Hamahata, Palo Alto, both of Calif.

[73] Assignee: Zexel USA Corporation, Fort Worth, Tex.

[21] Appl. No.: 220,362

[22] Filed: Mar. 30, 1994

Related U.S. Application Data

[63] Continuation of Ser. No. 778,344, Oct. 16, 1991, abandoned.

[51] Int. Cl.$^6$ ............................. G06G 7/78; G08G 1/123
[52] U.S. Cl. ..................... 364/444; 364/443; 364/449; 340/988; 340/990; 340/995; 73/178 R
[58] Field of Search ..................... 364/444, 436, 364/449, 439, 478, 437, 454, 457; 340/995, 988, 990, 993, 991, 905, 994, 916, 992; 73/178 R; 342/450

[56] References Cited

U.S. PATENT DOCUMENTS

| | | | |
|---|---|---|---|
| 4,757,455 | 7/1988 | Tsunoda et al. | 364/449 |
| 4,763,270 | 8/1988 | Itoh et al. | 340/988 |
| 4,774,671 | 9/1988 | Itoh et al. | 364/449 |
| 4,951,211 | 8/1990 | De Villeroche | 364/444 |
| 4,963,864 | 10/1990 | Iihoshi et al. | 73/178 R |
| 4,992,947 | 2/1991 | Nimura et al. | 364/444 |
| 4,996,645 | 2/1991 | Schneyderberg Van Der Zon | 340/995 |
| 5,031,104 | 7/1991 | Ikeda et al. | 340/990 |
| 5,041,983 | 8/1991 | Nakahara et al. | 364/449 |
| 5,182,555 | 1/1993 | Summer | 340/905 |

*Primary Examiner*—Kevin J. Teska
*Assistant Examiner*—Jacques H. Louis-Jacques
*Attorney, Agent, or Firm*—Morrison Law Firm

[57] ABSTRACT

A navigation system for a vehicle enables an operator to know a calculated optimal path from a starting point to a destination before departure. After the optimal path is calculated, a preview function allows the operator to sequentially view the calculated optimal path either prior to departure or at any point along the optimal path. A cancel function allows the operator to cancel a displayed portion of the optimal path and to request calculation and display of an alternate optimal path which does not employ the canceled portion of the original optimal path.

6 Claims, 5 Drawing Sheets

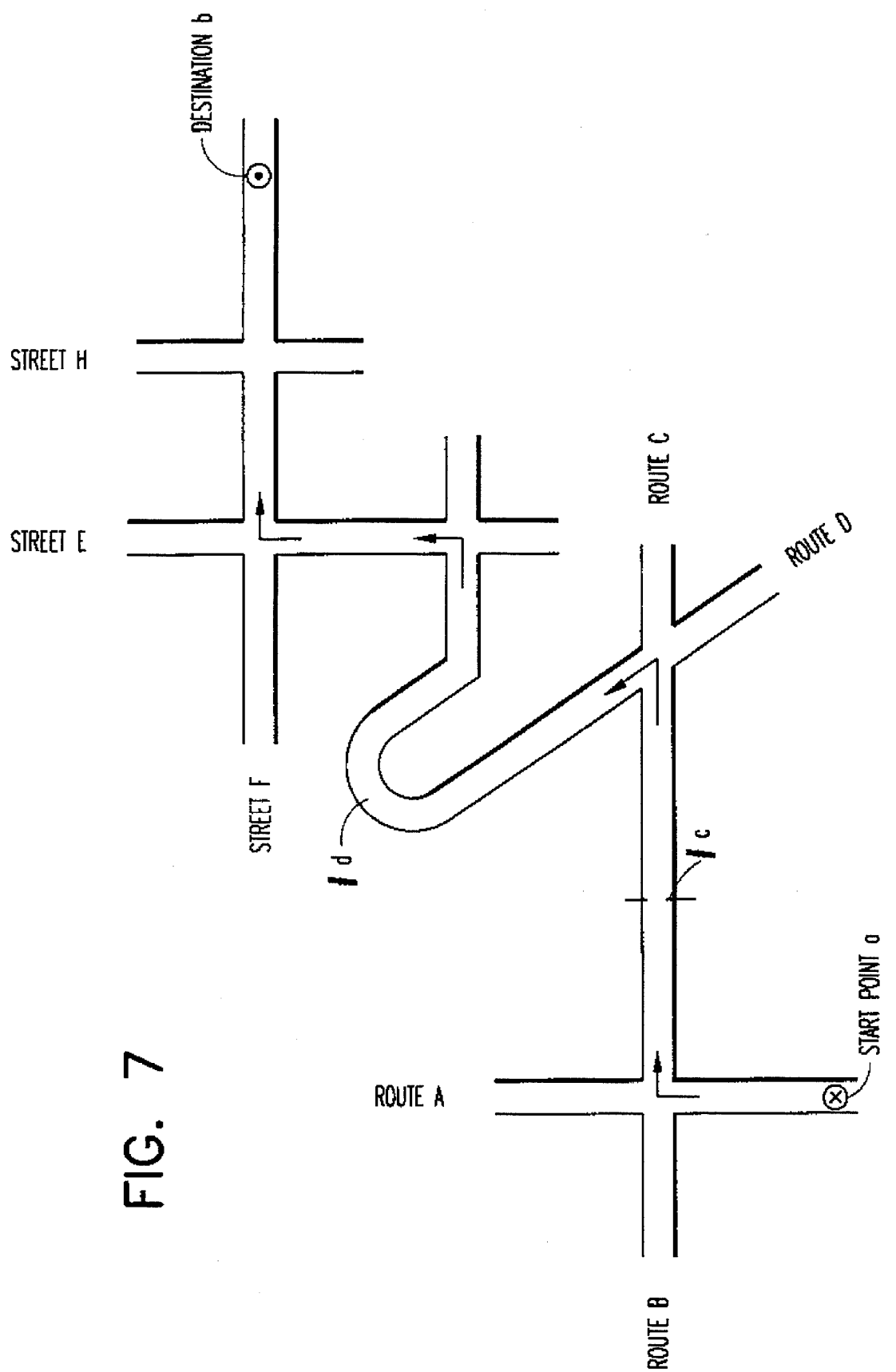

VEHICLE MOUNTED NAVIGATION SYSTEM WITH PREVIEW FUNCTION

This is a continuation of application Ser. No. 07/778,344 filed on Oct. 16, 1991, now abandoned.

BACKGROUND OF THE INVENTION

This invention relates to a navigation system in which an optimum path from a start point to a destination is calculated, and the vehicle is guided along the optimum path.

Generally, in a navigation system of this type, an optimum path between a start point and a destination is calculated beforehand in accordance with a map information, and after the start of a vehicle, path information, such as road names and the direction of travel, are sequentially displayed in the form of a picture image on a display device in accordance with the present position of the vehicle, thereby guiding the vehicle from the start point to the destination.

In such a navigation system, the path information is sequentially displayed, and therefore even if the driver has no idea of the path from the start point to the destination, he can arrive at the destination without fail by driving the vehicle in accordance with the path information displayed.

When driving the vehicle, it is desirable for the driver to know the optimal path beforehand, for example, in order to secure driving safety and to prevent the vehicle from departing from the optimal path, which may be caused by the overlooking the displayed path information.

In the above conventional navigation system, however, the path information is sequentially displayed in accordance with the present position of the vehicle, and therefore the path information is not displayed unless the vehicle is actually driven. Thus, the conventional navigation system does not allow the driver to know the optimal path beforehand.

OBJECTS AND SUMMARY OF THE INVENTION

With the above problem of the prior art, it is an object of this invention to provide a navigation system by which the driver, driving a vehicle, can know beforehand a calculated optimum path to thereby enhance the driving safety and prevent the vehicle from departing from the optimum path.

According to the present invention, there is provided a navigation system for a vehicle comprising:

(a) optimum path calculating means (1) for calculating an optimal path between a start point and a destination in accordance with a map information;

(b) present position calculating means (2) for calculating the present position of the vehicle;

(c) path information output means (3) for outputting a path information, based on the optimal path calculated by the optimum path calculating means (1), in accordance with the present position of the vehicle calculated by the present position calculating means (2);

(d) path information display means (4) for displaying the path information from the path information output means (3); and (e) instruction signal output means (5) having a manually-operating portion (5a), the instruction signal output means (5) outputting an instruction signal when the manually-operating portion (5a) is operated, so as to cause the path information output means (3) to output the path information.

The optimum path calculating means 1 calculates the optimal path between the start point and the destination in accordance with the map information. After this calculation, the present position calculating means 2 calculates the present position of the vehicle during normal travel of the vehicle between the start point and the destination. The path information output means 3 sequentially outputs the path information, based on the optimal path, in accordance with the present position of the vehicle. The path information display means 4 displays the path information output sequentially from the path information output means 3. After the calculation of the optimal path, when the manually-operating portion 5a is operated before the vehicle starts for the destination, the instruction signal output means 5 outputs a signal to the path information output means 3, so that the path information output means 3 outputs the path information to the path information display means 4, and the path information display means 4 displays the path information.

BRIEF DESCRIPTION OF THE DRAWINGS

FIG. 7 is a view showing part of the map information.

DESCRIPTION OF THE PREFERRED EMBODIMENT

One preferred embodiment of the present invention will now be described with reference to FIGS. 2 to 7.

Figure 1:
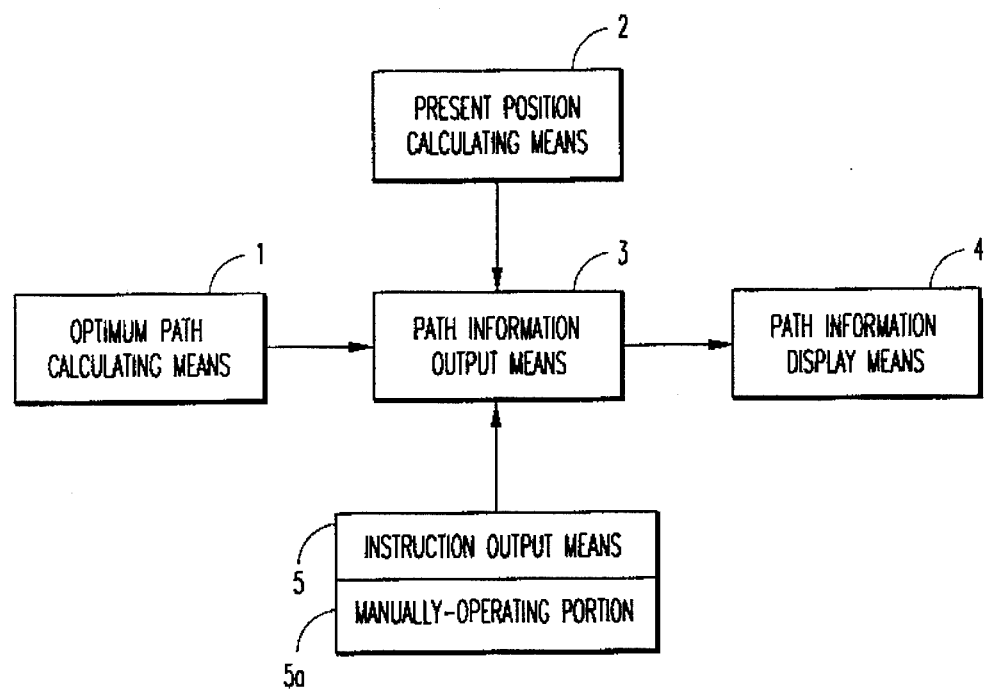
FIG. 1 is a block diagram of a navigation system according to the present invention.
Figure 2:
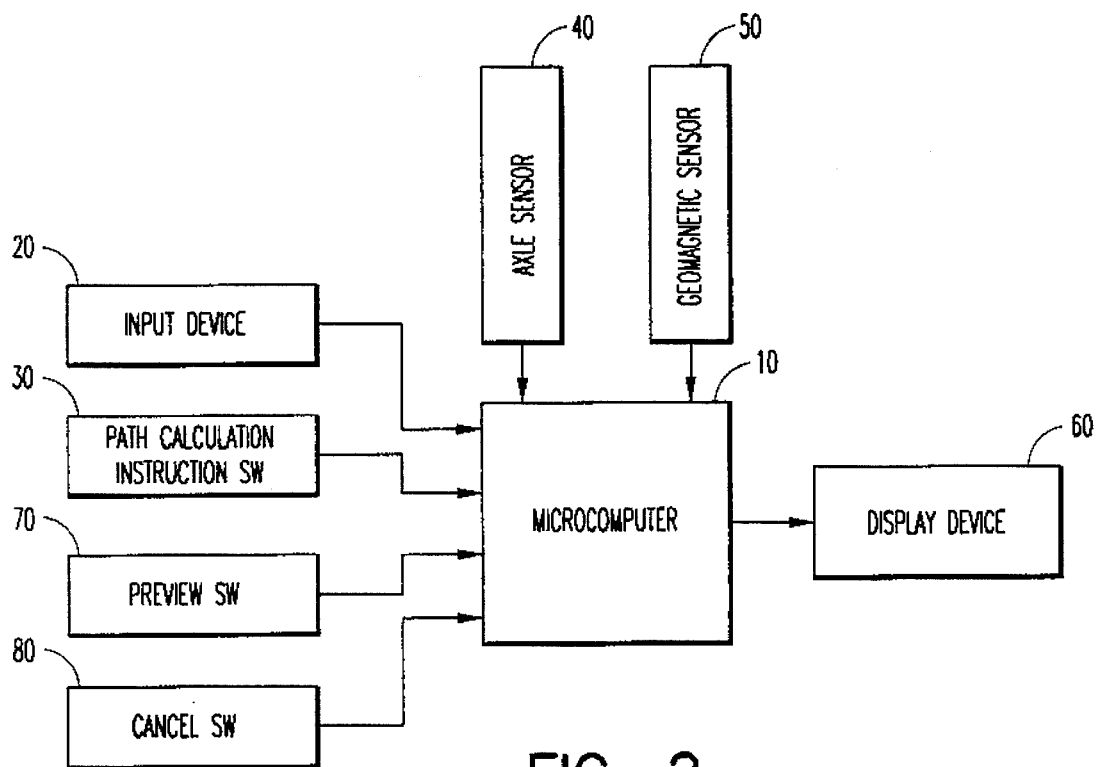
FIG. 2 is a block diagram of a preferred embodiment of the present invention.

FIG. 2 shows a general construction of a navigation system according to the present invention. This navigation system comprises a microcomputer 10. A starting point and a destination are input into the microcomputer 10 through an input device 20 such as a keyboard. When a path calculation instruction switch 30 is operated, the microcomputer 10 calculates or computes an optimal path from the start point to the destination in accordance with map information. Usually, the optimal path is calculated so that the shortest distance or the shortest time can be obtained. The map information is usually input from an external memory such as a CD-ROM and an IC card, but may be stored in an internal memory of the microcomputer 10.

The microcomputer 10 calculates an accumulated travel distance of the vehicle in accordance with an input signal from an axle sensor 40 for detecting the number of revolutions of an axle of the vehicle. The microcomputer 10 calculates a bearing during the travel in accordance with an input signal from a geomagnetic sensor 50. The microcomputer 10 calculates the present position of the vehicle in accordance with the accumulated travel distance and the bearing data. The present position of the vehicle may be computed according to a global positioning system with satellites (GPSS) using three or four artificial satellites.

The present position of the vehicle can be determined in the above manner, and therefore when calculating the optimal path, the present position of the vehicle may be, in some cases, the starting point, in which case there is no need to input the starting point.

The microcomputer 10 sequentially outputs path information, corresponding to the present position of the vehicle, to a display device 60 (e.g. a CRT display device), so that the display device 60 displays each path information. By doing so, the path guidance during the travel of the vehicle is made.

Here, the path information means information necessary for guiding the vehicle along the optimal path. In this embodiment, the name of the next road (to which the vehicle is to enter subsequently to the road along which the vehicle is running at present), the direction of entry into that road, and the distance from the present position of the vehicle to that road are displayed as the path information. Of course, other path information, such as the name of the road along which the vehicle is running at present, may also be displayed. In this embodiment, in connection with a preview function (later described), each time the vehicle arrives at a point where the path information is switched, the value of a counter N is changed by one (i.e., from 1 to 2, from 2 to 3, . . . ) to thereby bring the value of this counter N into conformity with the path information.

The path guidance will now be specifically described with reference to FIGS. 6 and 7. Let's assume that the optimal path from a start point a to a destination b (located on street F) via route (national road) A, route B, route C, route D and street E is calculated, as shown in FIG. 7.

Route B is continuous with route C, and they are divided at a point c.

Figure 6A:
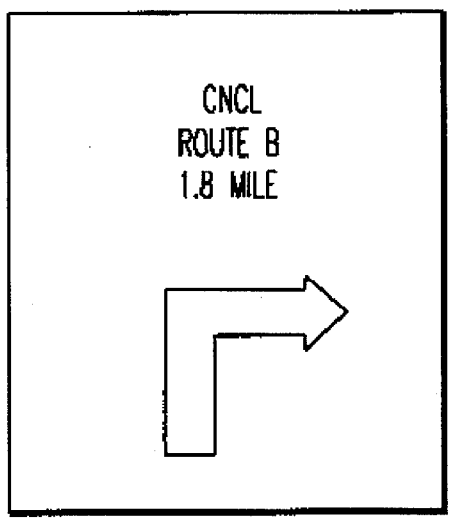
FIGS. 6(A) to 6(D) are views showing examples of path information to be displayed on a display device.

As shown in FIG. 6(A), at the starting point a, characters "ROUTE B" indicative of the next route B to which the vehicle is subsequently to enter are displayed, and also an arrow indicative of right turning is displayed. The value of the counter N at this time is "1".

Figure 6B:
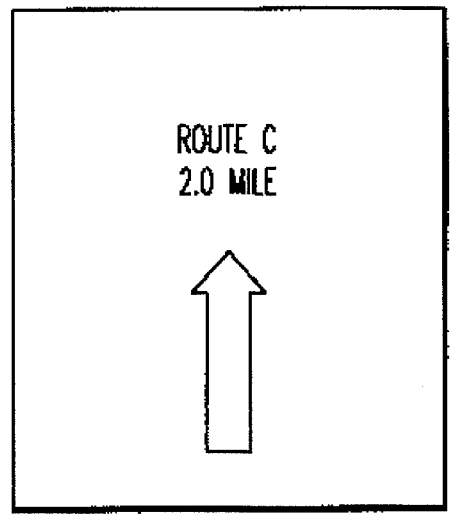

The vehicle runs along route A, and when the vehicle passes past the intersection between route A and route B, the displayed information is switched, so that characters "ROUTE C" indicative of the next route C on which the vehicle is subsequently to enter are displayed, as shown in FIG. 6(B). In this case, since the direction of travel is not changed, an arrow indicative of going straight is displayed. The value of the counter N at this time is "2".

Figure 6C:
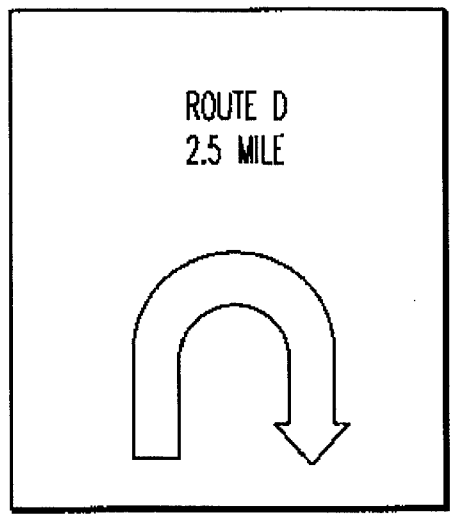
Figure 6D:
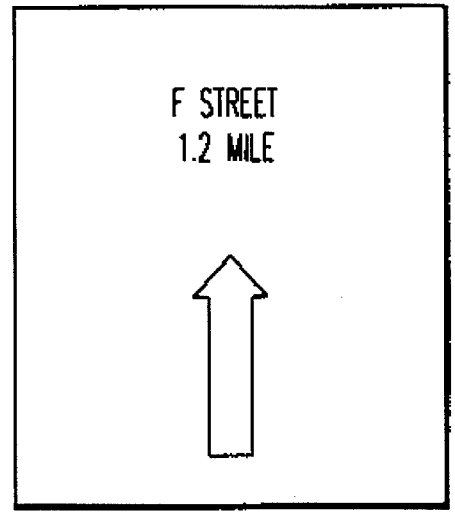

In this manner, the names of the roads to which the vehicle is to enter, as well as the travel direction, are sequentially displayed, thereby effecting the guidance from the starting point a to the destination b. However, when the vehicle enters from the street E to the street F on which the destination b is located, characters "F STR" indicative of the street F are displayed, and also an arrow indicative of going straight is displayed, as shown in FIG. 6(D).

Where there is a hair-pin curve at a point d where the travel direction is changed about 180°, it is preferred to display an arrow indicative of the hair-pin curve, as shown in FIG. 6(C), in order to enhance the safety. In this case, this display is given immediately after the vehicle enters from route C to route D; however, since route D continues even after the vehicle travels past point d, the characters "ROUTE D" indicative of route D are displayed. Whether or not such path information on the same road should be displayed is determined in view of whether or not the radius of curvature of the curve, a change in the travel direction, etc. exceed respective threshold values.

As shown in FIG. 2, the navigation system of this embodiment further comprises a preview switch (instruction signal output means) 70 and a cancel switch 80. When each of these switches 70 and 80 is manually operated, a signal is output from it to the microcomputer 10.

More specifically, each time the preview switch 70 is operated, the microcomputer 10 outputs the above path information to the CRT display device 60, so that the display device 60 displays the path information.

The cancel switch 80 serves to determine whether or not the path displayed in response to the operation of the preview switch 70 is canceled. When the cancel switch 80 is operated, the displayed path is canceled. The cancellation of the path is effected when re-calculating the optimal path as later described, and when the optimal path is to be re-calculated, the canceled path is excluded from the optimal path to be calculated. When the cancel switch 80 is operated, characters "CNCL" as shown in FIG. 6(A) are displayed.

Figure 4:
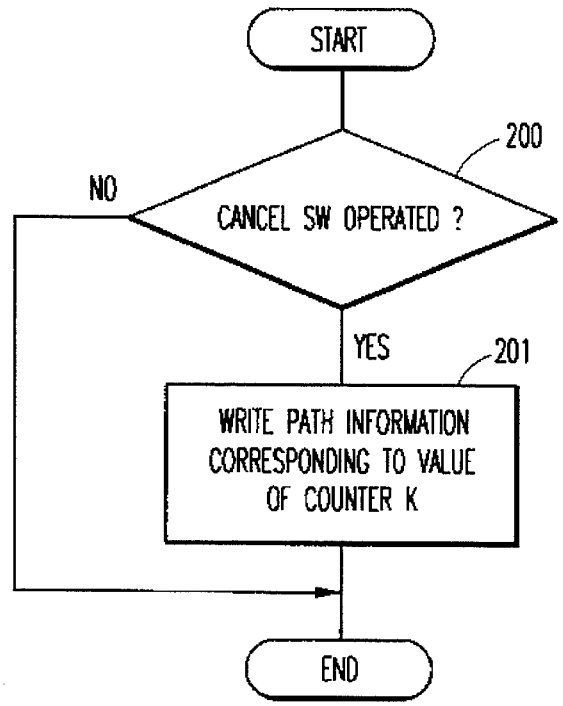
FIG. 4 is a flow chart for canceling a path by the operation of a cancel switch.
Figure 5:
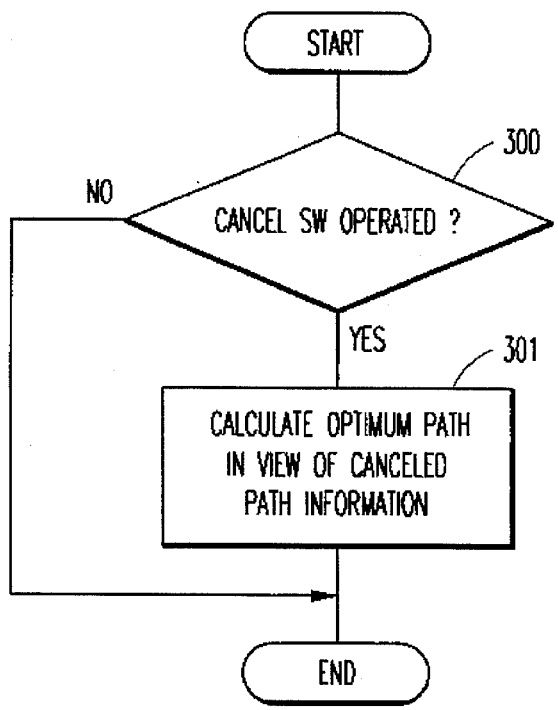
FIG. 5 is a flow chart for calculating the optimal path.

The display of the path information by the preview switch 70 (hereinafter referred to as "preview function") and the cancellation of the path by the cancel switch 80 (hereinafter referred to as "cancel function") will now be described in detail with reference to flow charts of FIGS. 3 to 5. Programs shown in the flow charts of FIGS. 3 and 4 are executed at predetermined time intervals.

Figure 3:
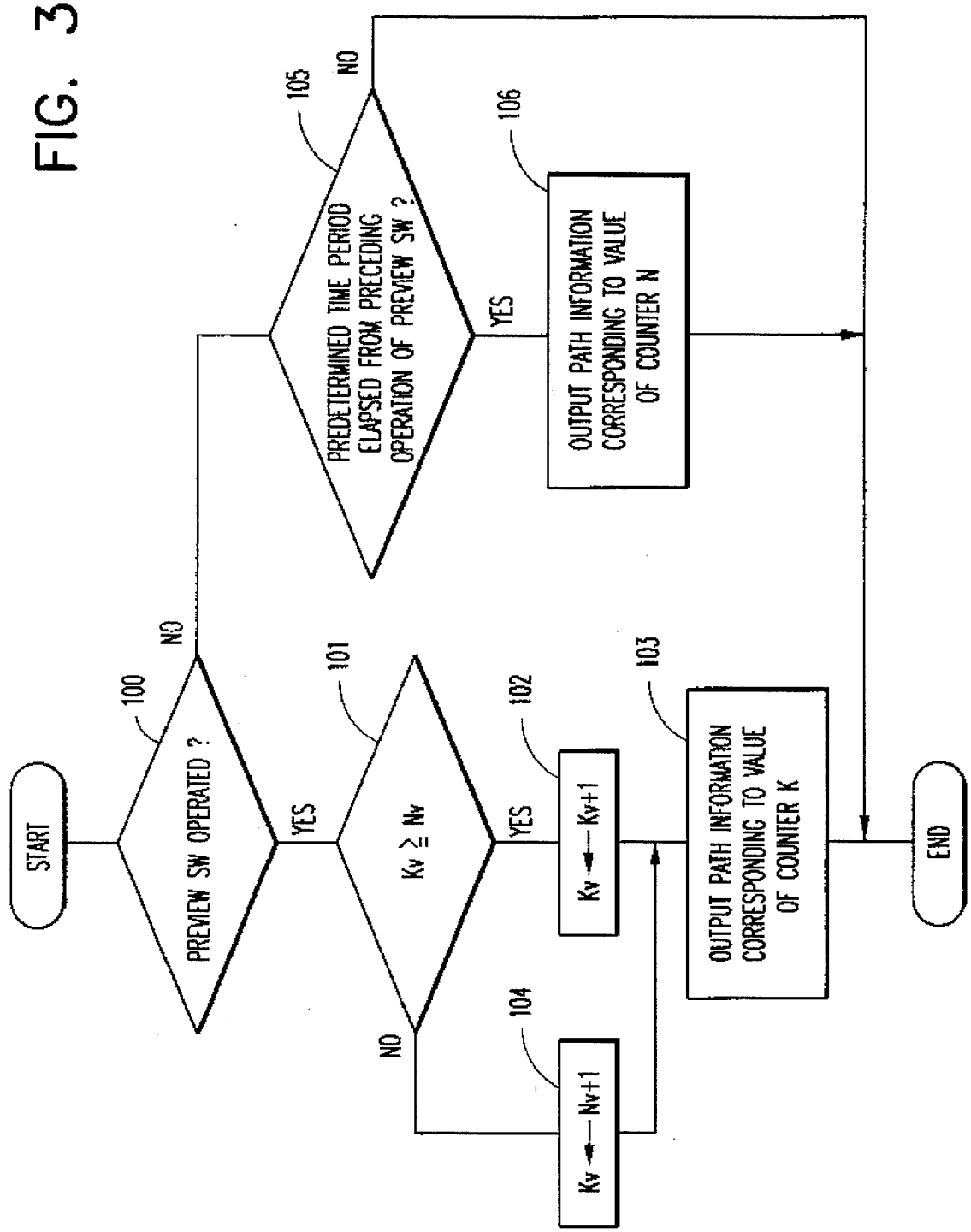
FIG. 3 is a flow chart for sequentially displaying path information by the operation of a preview switch.

Referring first to the preview function, after the program of FIG. 3 is started, it is judged in Step 100 whether or not the preview switch 70 has been operated.

If it is judged that the preview switch 70 has been operated, the program proceeds to Step 101 in which the value Kv of a counter K is compared with the value Nv of the counter N. If Kv≧Nv is obtained, (kv+1) is written onto the counter K (Step 102). Then, in Step 103, the path information corresponding to the value of the counter K is output, and the program is finished. Of course, the thus output path information is displayed on the display device 60.

Here, the initial value of the counter K is "1". Therefore, when the preview switch 70 is operated before the vehicle is started from the starting point, the path information (shown in FIG. 6(B) next to the path information shown in FIG. 6(A) is displayed by the display device 60. Subsequently, each time the preview switch is operated, the path information based on the optimal path is displayed.

If the result of the judgment of Step 101 is "Kv<Nv", (Nv +1) is written onto the counter K (Step 104). Then, in Step 103, the path information corresponding to the value of the counter K is output.

As is clear from the foregoing, if the vehicle is turned on before the preview switch 70 is operated, so that the vehicle is running while the path information shown in FIG. 6(B) or any later path information is displayed, the path information next to the displayed path information is displayed upon operation of the preview switch 70.

If it is judged in Step 100 that the preview switch 70 has not been operated, it is judged in Step 105 whether or not the predetermined time period has elapsed after the preceding operation of the preview switch 70.

If it is judged that the predetermined time period has elapsed, the path information corresponding to the value of the counter N is output (Step 106). In contrast, if it is judged that the predetermined time period has not elapsed, the program is finished.

Referring now to the cancel function, after the program shown in FIG. 4 begins, it is judged in Step 200 whether or not the cancel switch 80 has been operated. If the judgment result is that the cancel switch 80 has not been operated, the program is finished. In contrast, if the judgment result is that the cancel switch 80 has been operated, the path information corresponding to the value of the counter K at this time is written onto the counter N (Step 201), and the program is finished.

If part of the path information is canceled by the cancel switch 80, the optimal path is re-calculated. The re-calculation of the optimal path is effected according to the program shown in FIG. 5. More specifically, when the path calculation instruction switch 30 is operated, the program shown in FIG. 5 is started. It is judged in Step 300 whether or not the cancel switch 80 has been operated.

If the judgment result is that the cancel switch 80 has not been operated, the program is finished.

In contrast, if the judgment result is that the cancel switch 80 has been operated, the optimal path is re-calculated, excluding the canceled path information (Step 301). At this time, the re-calculation of the optional path is effected, for example, as follows. The path information representative of the left turning at the intersection between route C and route D is canceled. In this case, there is adopted a method in which the vehicle goes straight past the intersection between route C and route D or turns right at this intersection, and then the subsequent path is re-calculated, or a method in which the vehicle goes straight past the preceding intersection (that is, the intersection between route A and route B) without turning right, and then the subsequent path is re-calculated, or a method in which a new optimal path between start point a and destination b is again calculated.

In the above navigation system, the preview switch 70 is provided, and each time the preview switch 70 is operated, the relevant path information is displayed, and therefore the optimal path can be displayed before the vehicle is started. Therefore, the vehicle can be driven safely, and the vehicle can be prevented from departing from the optimal path.

Particularly, in this embodiment, there is provided the cancel function, and therefore if the driver gets traffic information, for example, from a radio that there is a traffic snarl, the driver confirms whether or not this traffic snarl is on the optimal path, and if the traffic snarl is on the optimal path, the path leading to the traffic snarl is canceled, and the optimal path is re-calculated, thereby preventing the vehicle from being involved in the traffic snarl.

The present invention is not limited to the above embodiment, and suitable modifications can be made without departing from the scope of the invention.

In the above embodiment, although the relevant path information is displayed each time the preview switch 70 is operated, the path information may be displayed sequentially at predetermined time intervals by operating the preview switch 70 once.

In the above embodiment, although the path information from start point a to the destination b are sequentially displayed by operating preview switch 70, there may be provided a separate switch for sequentially displaying the path information from destination b to start point a.

In the above embodiment, although the path information is displayed by the picture image, the path information may be given by audio means.

As described above, in the navigation system of the present invention, by manually operating the instruction signal output means, the path information is sequentially displayed, and therefore before the vehicle travel from the starting point to the destination after the optimal path is calculated, the calculated optimal path can be known in advance. Therefore, the safety of the driving can be enhanced, and the vehicle can avoid departing from the optimal path.

What is claimed is:

1. A navigation system for a vehicle comprising:

optimum path calculating means for calculating an optimal path between a starting point and a destination in accordance with a map information;

present position calculating means for calculating a present position of the vehicle;

path information output means for transmitting a path information based on the optimal path calculated by said optimum path calculating means from the present position of the vehicle calculated by said present position calculating means;

path information display means for displaying the path information transmitted from said path information output means; and instruction signal output means having a manually-operating portion, said instruction signal output means including means for transmitting an instruction signal responsive to said manually-operating portion; and means in said path information output means for selecting and transmitting said path information.

2. A navigation system for a vehicle according to claim 1, wherein said path information comprises at least a turn icon, a road name, and a distance, said turn icon consisting of a microprocessor-generated videographical directional indicator.

3. A method of navigating a vehicle, which comprises the steps of:

calculating, on an electronically-stored map, an optimal path between a starting point and a destination;

calculating on said map a present position of said vehicle;

transmitting a plurality of instructions for following said optimal path from said present position to said destination;

said transmitting being responsive to a request by an operator for performing said transmitting prior to traveling on said optimal path;

displaying said plurality of instructions sequentially; and calculating and selecting an alternate optimal path responsive to a request from said operator of said vehicle.

4. A navigation system for a vehicle comprising:

a microcomputer adapted for calculating, on a map available to said microcomputer, an optimal path between a starting point and a destination;

sensors for determining, in cooperation with said microcomputer, a present position of said vehicle;

said microcomputer being further adapted for computing a plurality of instructions for following said optimal path from said present position to said destination;

means for displaying and plurality of instructions sequentially;

means for enabling an operator of said vehicle to preview said optimal path; and input means for permitting said operator of said vehicle to request an alternate optimal path on demand.

5. A navigation system as in claim 4, wherein said input means for permitting is voice-activated.

6. A navigation system for a vehicle according to claim 4, wherein said instructions comprise at least a turn icon, a road name, and a distance, said turn icon consisting of a microprocessor-generated videographical directional indicator.

* * * * *

(12) EX PARTE REEXAMINATION CERTIFICATE (9597th)
United States Patent
Fujii et al.

(10) Number: US 5,544,060 C1
(45) Certificate Issued: Apr. 15, 2013

(54) VEHICLE MOUNTED NAVIGATION SYSTEM WITH PREVIEW FUNCTION

(75) Inventors: Takao Fujii, Cupertino, CA (US); Toshihiro Hamahata, Palo Alto, CA (US)

(73) Assignees: Visteon Corporation, Van Buren Township, MI (US); VC Aviation Services, LLC, Van Buren Township, MI (US); Visteon Electronics Corporation, Van Buren Township, MI (US); Visteon Global Technologies, Inc., Van Buren Township, MI (US); Visteon International Holdings, Inc., Van Buren Township, MI (US); Visteon Global Treasury, Inc., Van Buren Township, MI (US); Visteon European Holding, Inc., Van Buren Township, MI (US); Visteon Systems, LLC, Van Buren Township, MI (US); Visteon International Business Development, Inc., Van Buren Township, MI (US)

Reexamination Request:
No. 90/012,603, Sep. 14, 2012

Reexamination Certificate for:
Patent No.: 5,544,060
Issued: Aug. 6, 1996
Appl. No.: 08/220,362
Filed: Mar. 30, 1994

Related U.S. Application Data
(63) Continuation of application No. 07/778,344, filed on Oct. 16, 1991, now abandoned.

(51) Int. Cl.
*G08G 1/0969* (2006.01)
*G01C 21/34* (2006.01)

(52) U.S. Cl.
USPC ... 701/419; 340/990; 340/995.19; 340/995.2; 340/988; 701/416

(58) Field of Classification Search ...................... None
See application file for complete search history.

(56) References Cited

To view the complete listing of prior art documents cited during the proceeding for Reexamination Control Number 90/012,603, please refer to the USPTO's public Patent Application Information Retrieval (PAIR) system under the Display References tab.

*Primary Examiner* — Adam Basehoar

(57) ABSTRACT

A navigation system for a vehicle enables an operator to know a calculated optimal path from a starting point to a destination before departure. After the optimal path is calculated, a preview function allows the operator to sequentially view the calculated optimal path either prior to departure or at any point along the optimal path. A cancel function allows the operator to cancel a displayed portion of the optimal path and to request calculation and display of an alternate optimal path which does not employ the canceled portion of the original optimal path.

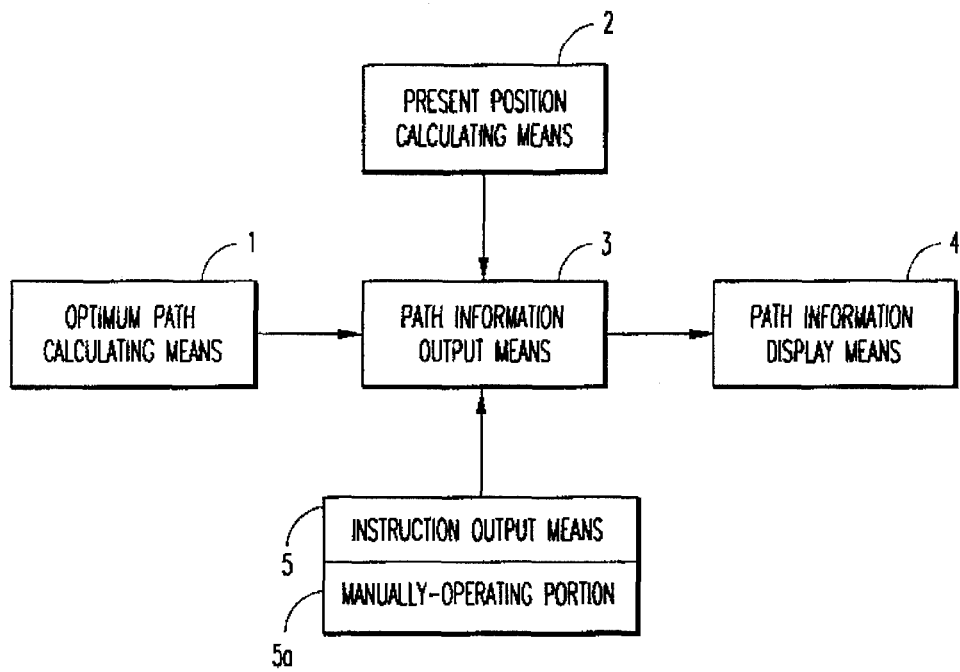

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 3, 4 and 6 is confirmed.

Claims 1, 2 and 5 were not reexamined.

* * * * *